United States Patent [19]

Jacob et al.

[11] Patent Number: 4,782,895
[45] Date of Patent: Nov. 8, 1988

[54] PUMPED OIL WELL BOTTOM SAFETY VALVE

[75] Inventors: Jean-Luc Jacob, Lescar; Jean Mourlevat, Verneuil sur Seine, both of France

[73] Assignee: Societe Nationale Elf Aquitaine (Production), France

[21] Appl. No.: 34,105

[22] Filed: Apr. 2, 1987

[30] Foreign Application Priority Data

Apr. 2, 1986 [FR] France .................. 86 04679

[51] Int. Cl.⁴ ............................................. E21B 43/00
[52] U.S. Cl. .................................... 166/108; 166/324
[58] Field of Search .............. 166/108, 110, 167, 168, 166/321, 324, 332, 334; 137/629; 257/58, 243

[56] References Cited

U.S. PATENT DOCUMENTS

| | | | |
|---|---|---|---|
| 739,042 | 9/1903 | White | 166/108 |
| 3,078,923 | 2/1963 | Tausch | 166/322 |
| 3,788,595 | 1/1974 | Colonna | 251/58 |
| 3,865,141 | 1/1975 | Young | 137/629 |
| 3,958,633 | 5/1976 | Britch et al. | 166/117.5 |
| 4,440,221 | 4/1984 | Taylor et al. | 166/106 |
| 4,519,457 | 5/1985 | Holland et al. | 166/317 |
| 4,641,707 | 2/1987 | Akkerman | 166/324 X |

Primary Examiner—Jerome W. Massie
Assistant Examiner—William P. Neuder
Attorney, Agent, or Firm—Ostrolenk, Faber, Gerb & Soffen

[57] ABSTRACT

An apparatus for automatically closing a bottom safety valve in a pumped oil well in case of a cessation of pumping, and reopening the valve when pumping resumes. A conventional valve pump is installed in the production tube. A channel, which is connected to the production tube, passes through the valve body, and is blocked by a controllable flap. The valve body also contains a second channel, the two channels communicating by means of a cavity which is located upstream of the flap. A push rod slidably retained in the second channel is actuated by a piston for opening and closing the flap. A conduit connects the downstream portion of the production tube to an admission chamber and thereby transmits pressure to the piston; such that, when the downstream pressure of the valve pump is greater than that at the bottom of the well, the flap remains open; and when the difference in the pressures is reversed, the push rod causes the flap to close.

8 Claims, 4 Drawing Sheets

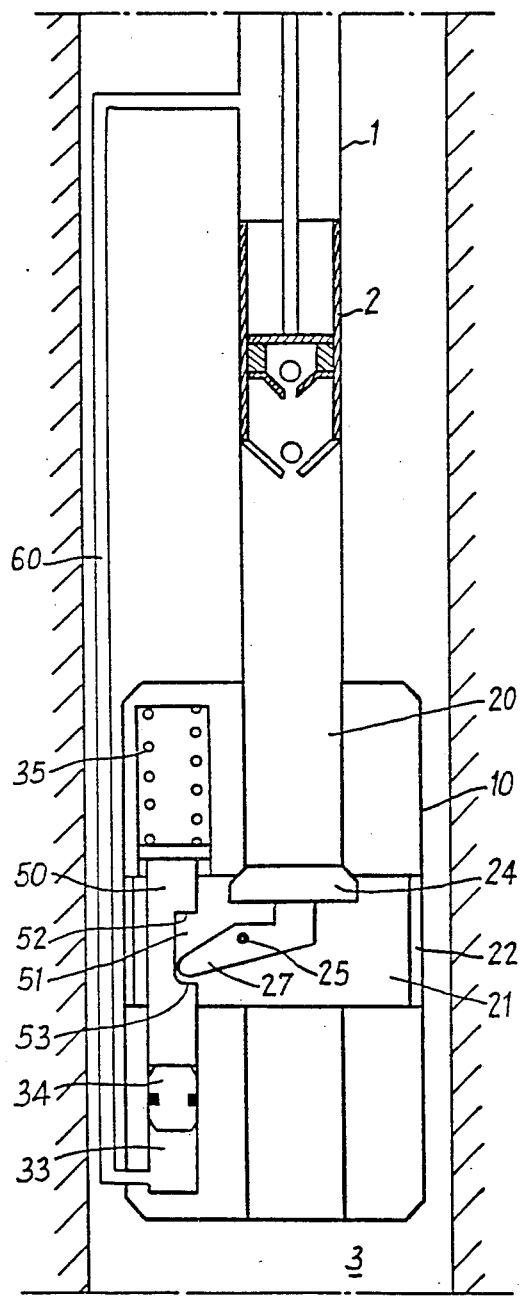
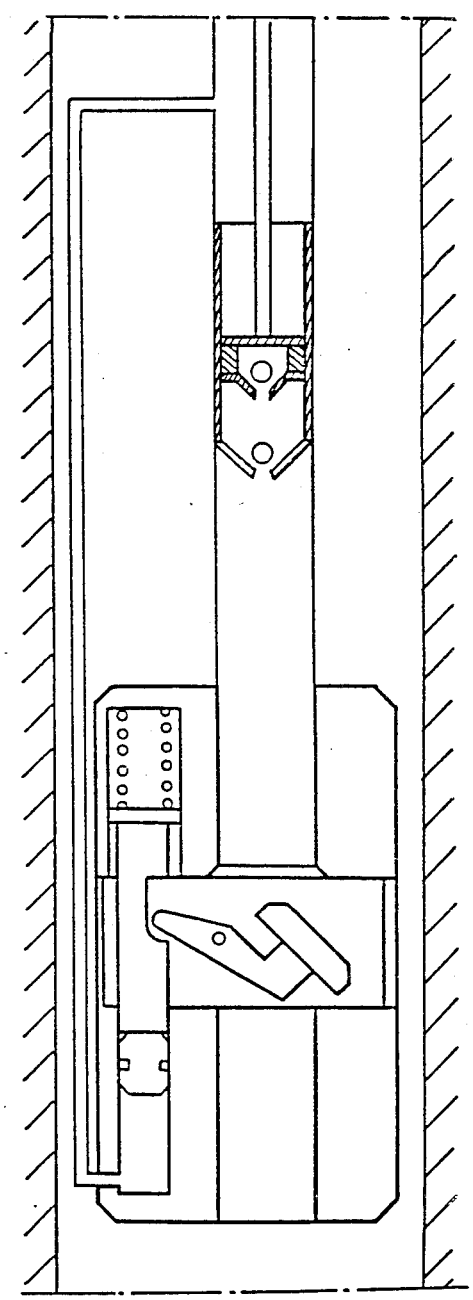

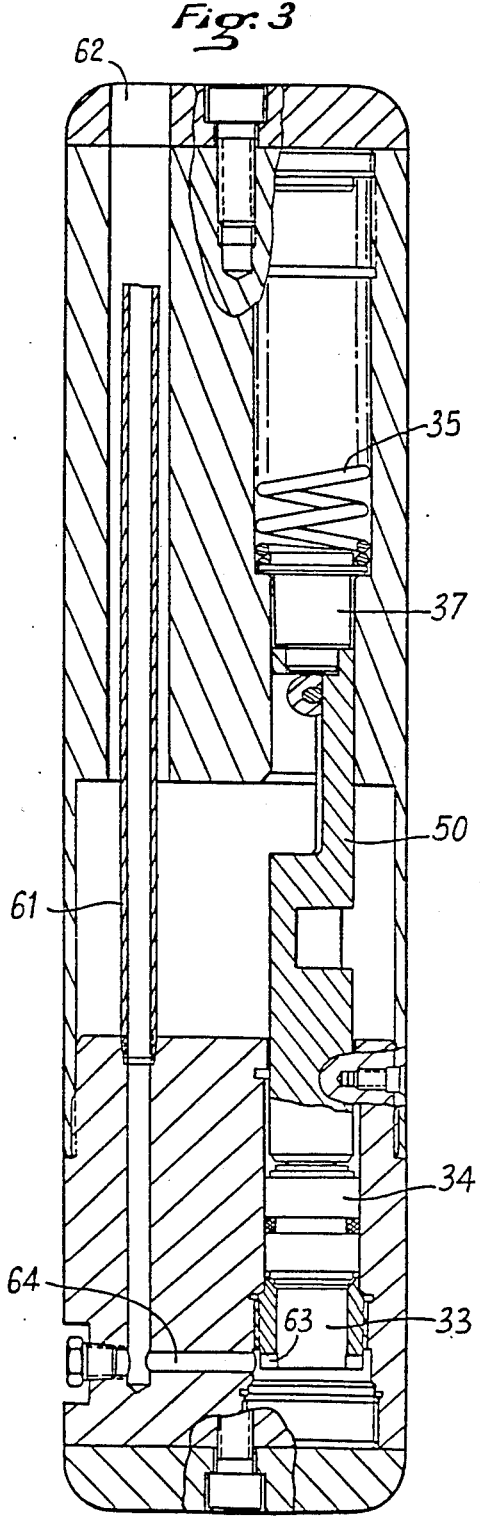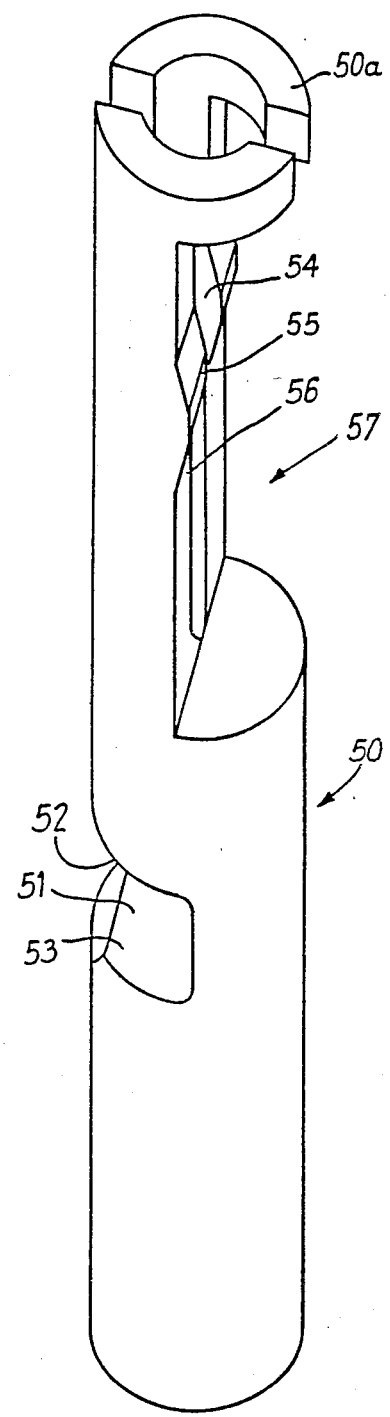

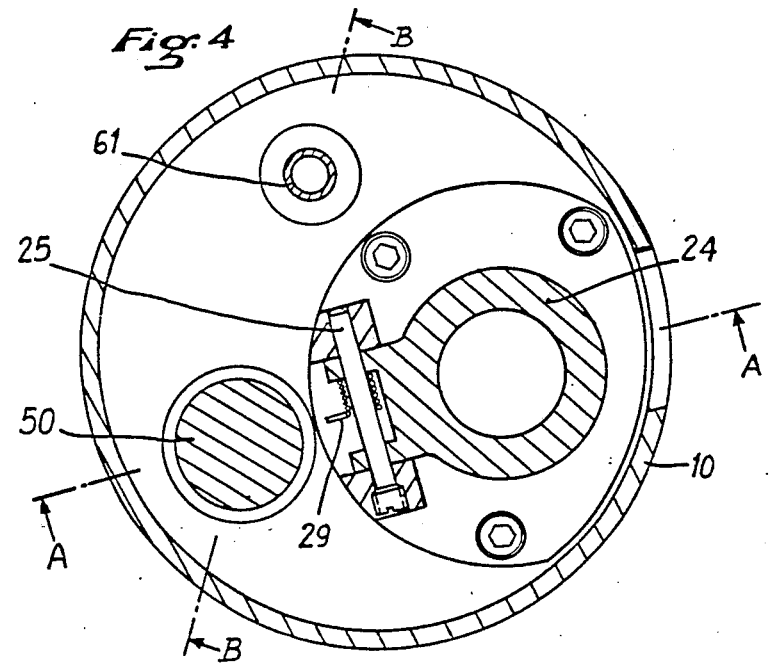
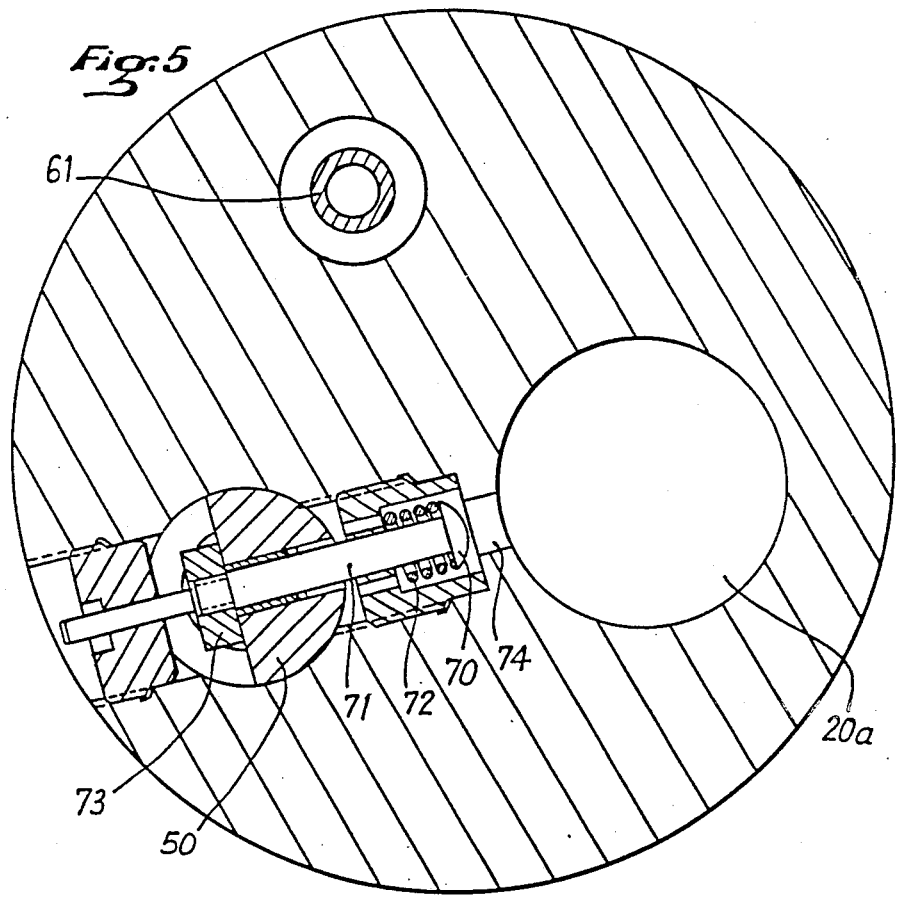

PUMPED OIL WELL BOTTOM SAFETY VALVE

The present invention relates to a well bottom safety valve for a pumped oil well controlling the oil input into a production tube having a pump provided with valves.

For maintaining the safety of a production well, a safety valve is generally installed which is controlled from the surface and which, driven hydraulically by means of a tube connected at the surface to the control panel, automatically closes the production tube in the case of need.

In the case of pumped wells, it has seemed advantageous to initiate the closure of the valve entirely automatically. In fact, following a pumping interruption, the well bottom pressure in the enclosure formed by the casing increases and becomes greater than the pressure reigning in the production tube downstream of the pump. In this case, closure of the valve controlling the input to the production tube is indispensable to prevent the oil rising up through the enclosure of the casing. The idea on which the present invention is based consists in ensuring automatically and independently the closure and opening of the valve as a function of the variation of the pressures reigning in the production tube and in the well bottom in the casing enclosure.

The invention provides such a safety valve for pumped wells which is characterized in that a hollow valve body has passing therethrough a first channel at the upper end of which emerges the lower end of the production tube, said channel comprising in its path a cavity of the valve body, into which emerges the lower end of the upper part of the channel and which is in communication with the outside of the valve body through an orifice formed in the valve body, said lower end of the upper part of the channel forming a valve seat cooperating with a flap pivoting about its axis mounted in a valve support, said valve body has a second axial channel closed at both ends and interrupted in its path by said cavity of the valve body, said second channel including a lower section forming a lower piston seat admission chamber and a cylinder communicating with said chamber, in which slides a piston on which bears the lower end of a push rod also sliding in said cylinder, the upper part of said rod being engaged in the upper section of said second channel, in which is housed a return spring on which the upper end of said return rod bears, which has in its median part housed in the cavity of the valve body a notch serving as fulcrum for the lever secured to the valve, so that sliding of the push rod may cause the closure and opening of the flap pivoting about its pivot axis, a duct connecting the admission chamber to the part of the production tube placed downstream of the pump.

Preferably, a part of the duct connecting the admission chamber to a part of the production tube placed downstream of the pump is housed inside the valve body, passes axially through it and emerges at the top of said body, a pipe external to the production tube connecting the orifice where said duct emerges to the part of the production tube downstream of the pump.

In an advantageous embodiment, a return spring urges the flap of the valve to the closed position.

In fact, when under satisfactory pumping conditions, the pressure in the production tube downstream of the pump remains greater than that in the casing enclosure, the push rod controlling the flap of the valve remains in a high position and the flap remains open, because of the pressure in the production tube transmitted through the piston to the push rod by means of the duct connecting the production tube to the cylinder in which slides the piston controlling the push rod.

When, following the interruption of pumping, the pressure in the production tube becomes less than the pressure in the casing enclosure, the push rod returned by the spring moves down causing closure of the flap of the valve.

When pumping is started again, the pressure in the production tube exceeds that in the casing enclosure, the piston rises and causes the flap of the valve to open.

However, the pressure upstream of the valve, which is that of the casing enclosure, still remains too high with respect to that reigning downstream of the valve, (which is that of the production tube) for the opening operation of the valve to be able to take place without the need of exerting excessive forces on the lever, which might damage the parts participating in the operation.

To avoid this, a very short lapse of time is provided in accordance with the invention during the rise of the push rod, during which the pressures are equalized before the push rod begins to urge the valve to open. The notch with which the push rod is provided has two abutment faces spaced apart and controlling the pivoting movement of the flap valve, so that, when in the closed position on the valve, the flap urged by a return spring is applied against its seat, the rise of the push rod causes opening of the valve with a delay. For this, a transverse duct connects the upper section of the second channel housing the return spring of the push rod with the first channel. In this duct is housed a valve for equalizing the pressures upstream and downstream of the flap valve, said pressure valve being secured to a sliding control rod having a return spring and carrying a plug, said pressure valve being placed against a seat in communication with the upper part of the first channel downstream of the valve flap. The push rod has on its part engaged in the upper section of the second channel a cut out with flat face having an inclined ramp for cooperating with said plug secured to the rod of the pressure valve for moving the pressure valve away from its seat during the rise of the push rod.

The cut out on the push rod in its part engaged in the upper section of the second channel is shaped as a cam-cooperating with the plug of the control rod of the pressure valve, the inclined ramp of the push rod for causing the pressure valve to move away from its seat being followed, in the rising direction of the push rod, by a short flat, then by an inclined ramp in the opposite direction to the first ramp, so that the plug of the rod cooperating with the cam causes, in a first stage, opening of the pressure valve, then closure thereof after a short lapse of time sufficient for causing equalization of the pressures upstream and downstream of the flap of the valve.

Other features of the invention will be clear from the description of an embodiment given by way of example and illustrated by the drawings, in which:

FIGS. 1a and 1b show schematically the principle of the valve of the invention, respectively, in the closed position and is the opened position;

FIG. 3 is a longitudinal section through B—B of FIG. 4;

FIG. 4 is a cross section through C—C of FIG. 2;

FIG. 5 is a cross section through D—D of FIG. 2; and

FIG. 6 shows the push rod in perspective.

Figure 2:
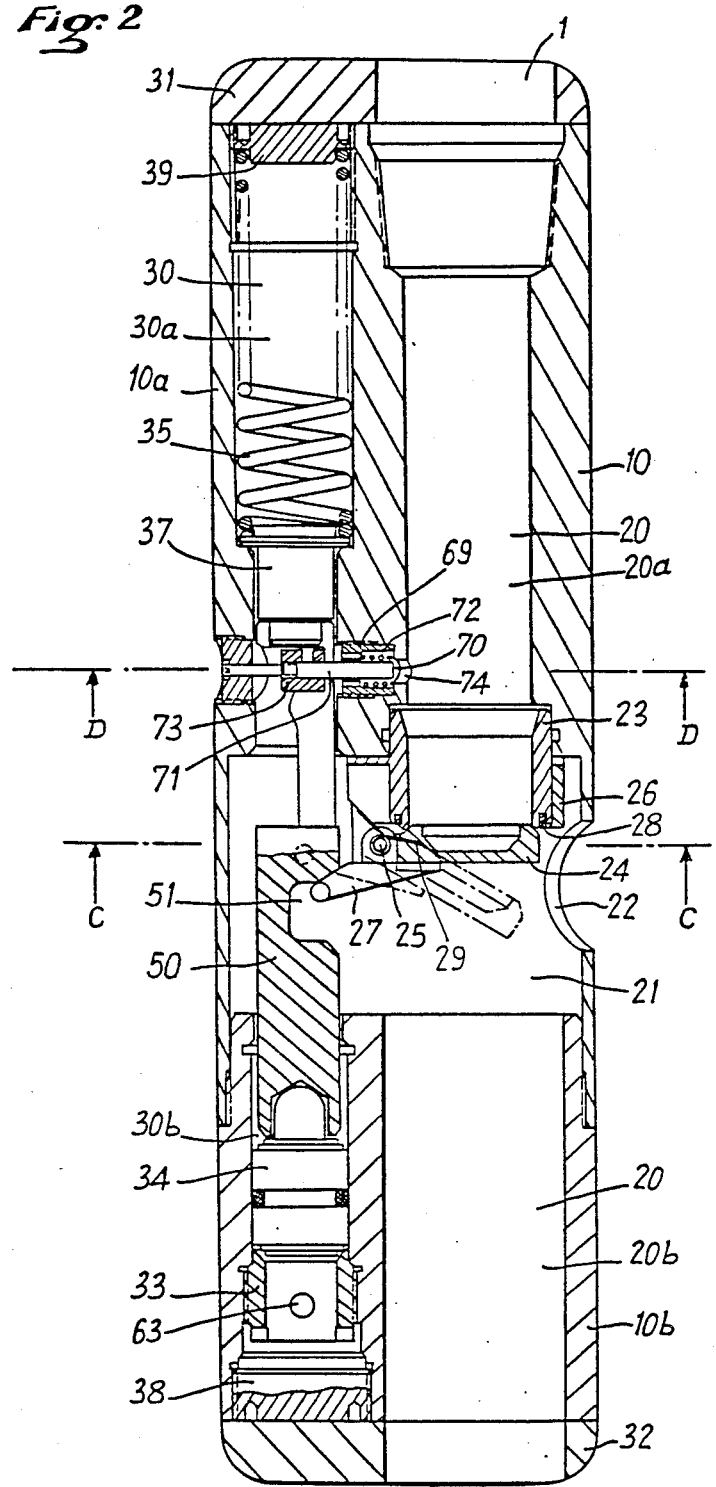
FIG. 2 shows the valve body in longitudinal section through A—A of FIG. 4.

Inside the casing in the bottom of the well (3) is placed a production tube 1 in which is installed a conventional valve pump 2.

A valve body 10 formed of an upper block 10a and a lower block 10b is closed at the ends by an upper shoe 31 and a lower shoe 32.

An axial channel 20 passes through the valve body 10 from side to side and at the position where the lower shoe 31 is provided with an opening joins up with the lower end of the production tube 1.

Channel 20 is formed of an upper section 20a whose lower end provided with a valve support 26 emerges into a cavity 21 of the valve body and a lower section 20b opening through an orifice in the lower shoe 32 to the outside of the valve body. The cavity 21 also communicates with the outside of the valve body through an orifice 22 formed in the wall of this latter.

The lower end of the upper section 20a of the channel forms a valve seat 23 with its seal 28, cooperating with a flap 24 pivoting about its pivot axis 25 mounted in the valve support 26. Flap 24 is secured to a lever 27 for controlling the flap valve. A return spring 29 urges the flap valve to the closed position.

The valve body has a second channel 30 closed at both ends by plugs 38 and 39 and which is interrupted in its median part by the cavity 21 of the valve body. This channel includes a lower section 30b at the bottom of which is housed an admission chamber 33 forming the seat of a piston 34 which slides in a cylinder extending and in communication with said admission chamber.

Into chamber 33 opens an orifice 63 of a duct 61 which will be discussed hereafter.

On piston 34 comes to bear the lower end of a push rod 50 whose lower part also slides in the cylinder of piston 34 whereas its upper part is engaged in the upper section 30a of channel 30. In channel 30 is housed a return spring for the push rod 50 having a guide 37 and on which comes to bear the upper end 50a of the push rod.

The push rod 50 is provided in its median part with a notch 51 serving as fulcrum for the lever 27 of flap 24, so that sliding of the push rod may cause closure and opening of flap 24.

A pipe designated by 60 in FIG. 1a is formed of a duct 61 which passes axially through the valve body (FIG. 3), then through a bend 64 opens through the orifice 63 into the admission chamber 33. Duct 61 opens at 62 into the valve body and is connected by a pipe external to the valve body with the space above the pump 2 in the production tube 1, thus transmitting the pressure downstream of the pump 2 to the admission chamber 33.

The notch 51 of the push rod 50 has two bearing faces 52 and 53 which are spaced stops and which control the pivoting movement of the flap so that, when in the closed position, the flap urged by spring 29 is applied against its seat 23, the rise of rod 50 causes opening of the flap with a delay.

The upper section 20a of channel 20 whose end is provided with the valve flap support 26 communicates with the cavity 21 of the valve body through a transverse duct 69 connecting said channel 20 to the upper section 30a of the second channel 30. In said transverse duct 69 is housed a valve 70 for equalizing the pressures downstream and upstream of flap valve 24. The pressure valve 70 is placed on its seat 74 so as to cause the upper part 20a of the first channel (downstream of the flap valve) to communicate with the cavity 21 which is upstream of the flap valve. This pressure valve is applied against its seat by means of a valve spring 72 and is secured to a sliding valve rod 71 on which is mounted a plug or abutment 73.

Push rod 50 has on its part engaged in the upper section of the second channel 30 a cut out 37 having a flat face with an inclined ramp 54 cooperating with the plug 73 secured to rod 71 for moving the pressure valve 70 away from its seat 74 during the rising movement of the push rod 50. The inclined ramp 54 is followed, in the rising direction of the rod, by a short flat 55, than by a ramp 56 inclined in the opposite direction to the first ramp, so that plug 73 cooperating with the cam thus formed causes in a first stage, opening of the pressure valve then closure thereof after a short lapse of time sufficient for causing equalization of the pressures upstream and downstream of the flap of the valve.

The operation of the valve is as follows.

When pump 2 is operating normally, the pressure downstream of the pump is greater than that of the casing enclosure, the pressure transmitted through pipe 60 is sufficient to keep the push rod 50 in a high position while compressing the return spring 35 and the bearing face 53 of rod 50 maintains flap 24 open against the force of the spring 29.

When pumping is stopped, the pressure in the casing enclosure upstream of flap 24 increases and becomes greater than the pressure downstream of pump 2. This pressure difference is transmitted to piston 34 which, because of the action of the return spring 35, moves down, as well as rod 50. Flap 24, driven by its lever 27 abutting against the bearing face 52 of the push rod, pivots and closes the production tube 1. When pumping is resumed, the pressure downstream of pump 2 increases and this pressured difference is transmitted through duct 60 to the piston which begins to rise while taking the push rod 50 with it. Because of the spacing between the bearing faces 52 and 53, the push rod, before abutting against the bearing face 53, begins by pushing back with its inclined ramp 54 the rod 71 of the pressure valve which, by moving the pressure valve 70 away from its seat 74 against the action of spring 72, opens duct 69, which allows equalization of the pressures downstream and upstream of flap 24. This opening of the pressure valve is limited to the time for plug 73 to pass in front of the short flat 55. Then, with the plug 73 meeting the reversely inclined ramp 56, rod 71 slides in the opposite direction and applies the pressure valve against its seat.

With the push rod continuing to rise, the end of lever 27 meets the bearing face 53 of notch 51 of the rod and causes flap 24 to open.

This operation of the flap valve may thus be accomplished without application of an excessive force since the pressures upstream and downstream of the valve have been equalized beforehand.

The invention is susceptible of numerous variations within the scope of a man skilled in the art without departing from the scope or spirit of the present invention.

We claim:

1. A well bottom safety valve for pumped oil wells, wherein the valve is disposed in a production tube, a valve pump being placed in the production tube, the valve controlling the oil input into the production tube as a function of the pressure in the production tube and in the bottom of the well outside the production tube, the valve comprising:

- a valve body; a first channel passing through the valve body, the first channel having an upper end, and the production tube having a lower end at and the production tube extending from the upper end of the first channel;
- a cavity defined inside the valve body; an orifice in the valve body communicating between the cavity and outside of the valve body; the first channel having an upper portion above the cavity and the upper portion of the first channel having a lower end communicating into the cavity; a valve seat defined at the lower end of the upper portion of the first channel at the cavity; a flap valve pivotally supported at an axis in the valve body; a lever connected to the flap valve and movable for pivoting the flap valve around the pivot axis therefor;
- a second channel defined in the valve body, spaced from the first channel; means closing the ends of the second channel, the second channel defining a second pathway along the length thereof; the cavity extending to the second channel whereby the cavity interrupts the second channel to define an upper section and a lower section of the second channel; the second channel lower section forming a lower seat admission chamber; a cylinder in the admission chamber and a piston movable through the cylinder;
- a push rod above the piston and slidably supported in the cylinder for moving together with the piston in the cylinder, the push rod having a lower end which bears upon the piston in the cylinder, the push rod having an upper part which extends up through the cavity to the upper section of the second channel above the cavity; a return spring housed in the upper part of the second channel, the push rod having an upper end which bears upon the return spring;
- the push rod having a median part along its length which passes through the cavity in the valve body; a notch defined in the median part of the push rod and the lever connected to the flap valve extending into the notch; the lever and the flap valve being so placed that sliding of the push rod against the force of the return spring causes the lever to engage the push rod and causes the pivoting open of the flap valve, and return motion of the push rod permitting the notch to move to permit reclosing of the flap valve; and
- a duct connecting the admission chamber to a part of the production tube past the valve and past the pump on the production tube, downstream of the pump.

2. The safety valve of claim 1, wherein the duct includes a connecting part connecting the admission chamber to the part of the production tube downstream of the pump and on the side of the pump away from the valve, the connecting part of the duct being housed inside, passing through axially and emerging at the top of the valve body, a duct orifice being defined in the valve body where the duct emerges; a pipe external to the production tube and connecting the duct orifice to the production tube at a location downstream of the valve pump.

3. The safety valve of claim 1, further comprising a return spring normally urging the flap valve to the closed position against the valve seat therefor, and the motion of the push rod to compress the return spring of the push rod moving the lever to lift the flap valve off the valve seat.

4. The safety valve of claim 3, wherein the notch in the push rod includes opposite abutment faces that are spaced axially apart and between which the lever extends and the lever being sized so as to be spaced from at least one of the abutment faces, the abutment faces of the notch being so placed that in the closed position of the flap valve against the valve seat, the flap valve is urged by the flap valve return spring against the valve seat, and rising movement of the push rod to compress the push rod return spring at first does not cause an abutment face to contact the lever, and after a delay and additional movement of the push rod, one of the abutment faces of the notch contacts the lever and opens the flap valve by raising the flap valve off the valve seat.

5. The safety valve of claim 1, further comprising a transverse duct connecting the upper section of the second channel above the cavity with the first channel; a pressure valve in the transverse duct for equalizing the pressures upstream of and downstream of the flap valve in the first channel.

6. The safety valve of claim 5, wherein the pressure valve comprises a sliding control rod in the transverse duct; a plug seat at the transverse duct and in communication with the upper portion of the first channel and downstream of the sliding control rod; the slide rod including a plug for engaging the seat and closing the communication between the first and second channels; a sliding rod return spring for normally driving the sliding rod toward the position pressing the plug on the plug seat closing the communication between the first and the second channels;

the push rod having a portion at the upper portion of the second channel which has a cutout with an inclined ramp for engaging the sliding rod for moving the sliding rod against the force of the sliding rod return spring for raising the plug of the pressure valve off the plug seat during the rising of the push rod compressing the push rod return spring.

7. The safety valve of claim 6, wherein the cutout of the push rod is formed as a cam having the first mentioned inclined ramp of the push rod for causing the pressure valve plug to move away from the plug seat; on the pressure rod below the first-mentioned inclined ramp is a short-height flat and below the flat, a second ramp inclined in the opposite direction from the first ramp also for cooperating with the control rod plug, whereby the sliding control rod plug in a first stage is cammed by the first ramp to rise off the plug seat and open the pressure valve and as the push rod continues to rise against the force of the return spring thereof, the second ramp permitting the plug to reclose against the plug seat, whereby during the time the plug is off the plug seat, equalization of the pressures upstream and downstream of the flap valve may occur.

8. The safety valve of claim 7, wherein the notch and abutments in the push rod are positioned with respect to the first ramp of the push rod that the first ramp of the push rod opens the plug off the plug seat while the notch is moving past the lever, and the push rod abutment contacts the lever to open the flap valve after the plug has risen off the plug seat.

* * * * *